No. 744,740. PATENTED NOV. 24, 1903.
G. H. FROGGATT.
ROTARY AUTOMATIC WEIGHING MACHINE.
APPLICATION FILED MAR. 28, 1903.
NO MODEL.
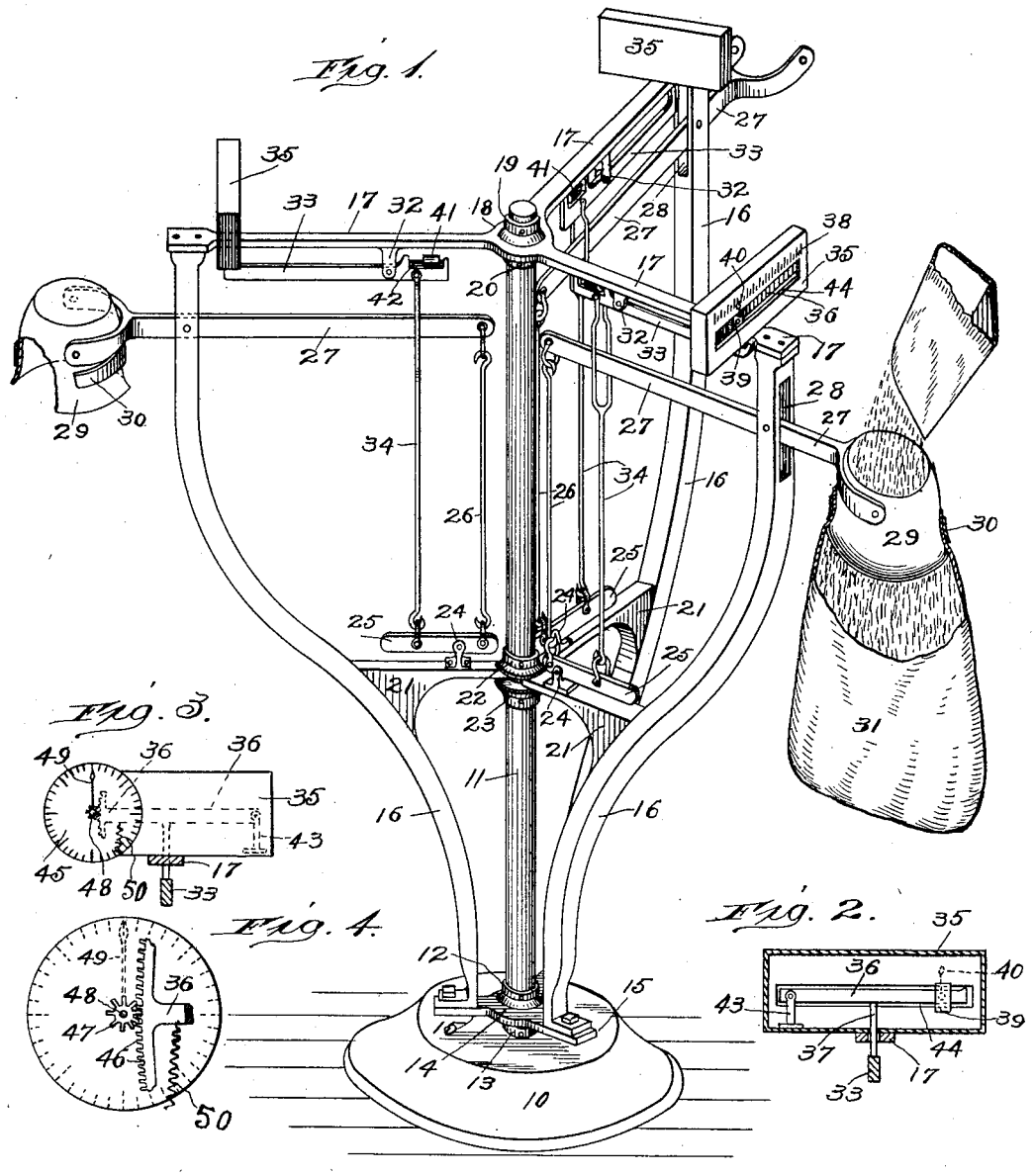
Witnesses:
Chas. E. Gorton
A. Gustafson
Inventor:
George H. Froggatt
By Chas. C. Tillman
Atty.

No. 744,740. Patented November 24, 1903.

UNITED STATES PATENT OFFICE.

GEORGE H. FROGGATT, OF CHICAGO, ILLINOIS.

ROTARY AUTOMATIC WEIGHING-MACHINE.

SPECIFICATION forming part of Letters Patent No. 744,740, dated November 24, 1903.

Application filed March 28, 1903. Serial No. 149,922. (No model.)

*To all whom it may concern:*

Be it known that I, GEORGE H. FROGGATT, a citizen of the United States, residing at Chicago, in the county of Cook and State of Illinois, have invented certain new and useful Improvements in Rotary Automatic Weighing-Machines, of which the following is a specification.

This invention relates to improvements in a rotary automatic weighing-machine; and while it is more especially intended to be used for weighing grain and the like in sacks, yet it is applicable for weighing other substances in bulk or packages; and it consists in certain peculiarities of the construction, novel arrangement, and operation of the various parts thereof, as will be hereinafter more fully set forth and specifically claimed.

The principal object of the invention is to provide a weighing machine or scale which shall be simple and inexpensive in construction, strong, durable, accurate, and effective in operation and so made that when used for weighing grain and the like in sacks it will hold and support them in such a manner that they can be readily filled from a chute or otherwise without holding them open by hand and which will weigh the sacks or bags and their contents when partially or completely filled.

Another object of the invention is to so construct the machine that it may be rotated so as to bring the empty sacks supported thereby or the scale it is desired to use to the proper point for the sack to be filled from a chute or otherwise or the scale to be used or read.

A further object is to afford a weighing-machine by means of which the sacks may be filled to a specific amount, each separate scale-beam being adjusted to a specific weight, or the amount may be indicated by a rotating finger on a dial-scale.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a perspective view of a weighing-machine embodying my invention, showing a sack supported thereby and in the act of receiving grain from a chute. Fig. 2 is a longitudinal sectional view of one of the casings or boxes for one of the scale-beams looking from the rear thereof. Fig. 3 is a view, partly in elevation and partly in section, showing a modification in the construction of the casings or boxes for the scale-beams; and Fig. 4 is a rear view, in elevation, of the dial scale or indicator and a part of the scale-beam used in said modification.

Like numerals of reference refer to corresponding parts throughout the different views of the drawings.

The reference-numeral 10 represents the base of the machine, on which is mounted an upright shaft 11, of any suitable size and height. Located on the lower end of the shaft 11, between two collars 12 and 13 thereon, is a plate 14, which has a number of arms 15, to which are secured the lower ends of the uprights 16 of the main or supporting frame. The upper ends of the uprights 16 are secured to the arms 17 of a spider 18, which is located on the upper end of the shaft 11 and usually between two collars 19 and 20, as shown. Between their ends each of the portions 16 of the frame is connected to the shaft 11 by means of a horizontal extension 21, the inner ends of which are usually located between two collars 22 and 23, secured thereon. The shaft 11 may be journaled in the base 10, so as to rotate therein, and the frame fixed to the shaft, so that they will rotate together, or the shaft may be fixed on the base and the frame rotatably mounted thereon.

Mounted on suitable supports at about the middle of the frame and shaft 11, and usually on the upper portion of each of the horizontal extensions 21, is a bracket 24, on each of which is pivotally secured a bar 25, to the inner end of which is connected at its lower end a rod 26, the other end of which is connected to the inner end of the sack-holding or material-supporting lever 27, each of which passes through a slot 28 in the upper end of each of the uprights 16 and is fulcrumed therein. The outer end of each of the levers 27 is forked and has pivotally secured between the prongs a sack-holder 29, which is trunco-cone-shaped and has each of its ends open. Loosely surrounding each of the bag-holders 29 is a band or ring 30, which is used to bind the sack or bag 31 to the holder. Secured to the lower surface of each of the arms 17 is a hanger 32, pivotally secured to each of which is a counterbalancing-beam 33, the inner portion of each of which is connected to the outer portion of the bar 25 by means of a rod 34, which is preferably forked at its upper end to stride the inner portion of the sack or material supporting lever. Mounted transversely on the upper surface of each of the arms 17 is a box or casing 35 for the scale-beam 36, which is supported transversely on the counterbalancing-beam 33 by means of an arm or connection 37, which extends through openings in the bottom of the box or casing 35 and the arms 17 of the supporting-frame. The face of each of the boxes or casings 35 is provided with a scale 38 to indicate pounds and fractions thereof, and each of the scale-beams 36 has slidably mounted thereon a weight 39, which carries a pointer 40 or indicator. Each of the counterbalancing levers or beams 33 may be provided with a weight 41, mounted on a horizontal screw 42, used for poising the weighing-beam. As shown in Fig. 2, each of the scale-beams 36 is pivoted near one of its ends on a suitable support 43 in the box or casing 35 therefor.

In Figs. 3 and 4 of the drawings I have shown a modification in the construction of the scale-beams and casings, which consists in omitting the slots 44 from the casings and securing on the face or front thereof at one of its ends a dial 45, having a scale thereon to indicate pounds and fractions thereof. In this modification the free end of the scale-beam 36 is provided with a rack 46, which meshes with a pinion 47, journaled in the dial and carrying on its shaft 48 a pointer 49 or indicator. In this modification the weight 39 is omitted from the scale-beam 36, and a gravity-resisting spring 50, which is secured at one of its ends to the said scale-beam near the rack 46 thereon and at its other end to the bottom of the casing, is used, as is clearly shown in Figs. 3 and 4 of the drawings.

From the foregoing and by reference to the drawings it will be seen and clearly understood that by placing the mouth of a sack on and around the lower portion of the holder 29 it may be securely held open thereon by means of the ring or band 30, which should be placed over the sack, as shown. By placing the weights at suitable points on the scale-beams, so as to indicate specific or predetermined weights, it is apparent that the frame may be turned so that the bags may be supplied with the requisite amount of grain and the like from a chute or otherwise, when the scale-beams will be counterbalanced thereby.

When the modification shown in Figs. 3 and 4 is employed, it is evident the indicator or pointer will revolve so as to show the amount contained in the sacks or held by the material-supporting levers. While I have shown said levers provided with bag-holders, yet it is obvious they may be omitted and other means for holding the material or articles to be weighed substituted therefor.

Having thus fully described my invention, what I claim as new, and desire to secure by Letters Patent, is—

1. In a weighing-machine, the combination with the frame, of a material-supporting lever fulcrumed thereon, means on the outer end thereof to hold the material to be weighed, a bar pivotally secured below said lever, a connection uniting the inner ends of said lever and bar, a counterbalancing-beam pivotally secured above the lever, a connection uniting the inner portion of said beam to the outer portion of said bar, a box or casing mounted on the frame above the outer portion of said beam and having on its face a graduated scale, a scale-beam pivotally secured at one of its ends within the casing and connected to the outer portion of the counterbalancing-beam, and an indicator, for the scale on the box, coacting with the scale-beam, substantially as described.

2. In a weighing-machine, the combination with the frame, of a material-supporting lever fulcrumed thereon, means on the outer end thereof to hold the material to be weighed, a bar pivotally secured below said lever, a connection uniting the inner ends of said lever and bar, a counterbalancing-beam pivotally secured above the lever, a connection uniting the inner portion of said beam to the outer portion of said bar, a box or casing mounted on the frame above the outer portion of said beam and having on its face a graduated scale, a scale-beam pivotally secured at one of its ends within the casing and connected to the outer portion of the counterbalancing-beam, and a weight slidably mounted on the scale-beam and carrying an indicator for the scale on the box or casing, substantially as described.

3. In a weighing-machine, the combination with a rotatably-mounted main frame having at its upper end a number of radial arms, of a material-supporting lever fulcrumed on the frame below each of said arms, means on the outer end of each of said levers to hold the material to be weighed, a bar pivotally secured below each of said levers, a connection uniting the inner ends of each of said levers to the inner ends of each of said bars, a counterbalancing-beam pivotally secured on each of the radial arms, a connection uniting the inner portion of each of said beams to the outer portion of each of said bars, a box or casing transversely mounted on each of the arms of the frame above the outer portion of each of said beams and having on its face a graduated scale, a scale-beam pivotally secured at one of its ends within each of the casings and connected to the outer portion of the counterbalancing-beam therebelow, and an indicator, for the scale on each of the boxes, coacting with each of the scale-beams, substantially as described.

GEORGE H. FROGGATT.

Witnesses:
CHAS. C. TILLMAN,
A. GUSTAFSON.